(12) United States Patent
Gu

(10) Patent No.: US 11,029,833 B2
(45) Date of Patent: Jun. 8, 2021

(54) NUMERICAL VALUE DETERMINATION METHOD, NUMERICAL VALUE DETERMINATION APPARATUS, ELECTRONIC DEVICE AND STORAGE MEDIUM

(71) Applicant: NETEASE (HANGZHOU) NETWORK CO., LTD., Hangzhou (CN)

(72) Inventor: Qiqi Gu, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 0 days.

(21) Appl. No.: 16/652,671

(22) PCT Filed: Feb. 26, 2019

(86) PCT No.: PCT/CN2019/076197
§ 371 (c)(1),
(2) Date: Mar. 31, 2020

(87) PCT Pub. No.: WO2019/165959
PCT Pub. Date: Sep. 6, 2019

(65) Prior Publication Data
US 2020/0401301 A1    Dec. 24, 2020

(30) Foreign Application Priority Data

Mar. 1, 2018 (CN) .................... 201810172800.X

(51) Int. Cl.
G06F 3/0484 (2013.01)
A63F 13/533 (2014.01)
G06Q 40/06 (2012.01)

(52) U.S. Cl.
CPC ........ *G06F 3/04847* (2013.01); *A63F 13/533* (2014.09); *A63F 2300/308* (2013.01); *G06Q 40/06* (2013.01)

(58) Field of Classification Search
None
See application file for complete search history.

(56) References Cited

U.S. PATENT DOCUMENTS 10,354,325 B1 *   7/2019   Skala ..................... G06Q 40/04
2007/0113183 A1   5/2007   Brinkmann et al.
(Continued)

FOREIGN PATENT DOCUMENTS

CN   103069373 A   4/2013
CN   104020944 A   9/2014
(Continued)

OTHER PUBLICATIONS

Track'nTrade-Futures, Forex, Stocks Trading Software, "Home>High Finance Stocks User Manual>Toolbars>Charting Tools>Crosshair Tool" retrieved Dec. 15, 2017, http://education.trackntrade.com/end-of-day-futures/50-user-manual/charting-tools/crosshair-tool.htm (Year: 2017).*

(Continued)

*Primary Examiner* — Tuan S Nguyen
(74) *Attorney, Agent, or Firm* — Qinghong Xu

(57) ABSTRACT

A numerical value determination method is applied to a terminal that can present an interactive interface, and the interactive interface includes a slider control. The method includes: controlling, according to a received operation event, the sliding control so that same moves within the interactive interface; acquiring a first projection position, on a first coordinate axis corresponding to a first count item, of the sliding control, and a second projection position, on a second coordinate axis corresponding to a second count (Continued)

item, of the sliding control; determining, according to the first projection position, a first count value corresponding to the first count item, and determining, according to the second projection position, a second count value corresponding to the second count item; and determining and presenting a target numerical value according to the first counting value and the second counting value.

13 Claims, 5 Drawing Sheets

(56) References Cited

U.S. PATENT DOCUMENTS

| | | | |
|---|---|---|---|
| 2008/0021806 A1* | 1/2008 | Townsend | G06Q 40/04 705/37 |
| 2014/0365947 A1 | 12/2014 | Karoji | |

FOREIGN PATENT DOCUMENTS

| | | |
|---|---|---|
| CN | 104102407 A | 10/2014 |
| CN | 104423578 A | 3/2015 |
| CN | 104850329 A | 8/2015 |
| CN | 105700752 A | 6/2016 |
| CN | 105824531 A | 8/2016 |
| CN | 106295183 A | 1/2017 |
| CN | 106445357 A | 2/2017 |
| CN | 106502545 A | 3/2017 |
| CN | 106896997 A | 6/2017 |
| CN | 206421388 U | 8/2017 |
| CN | 108319490 A | 7/2018 |

OTHER PUBLICATIONS

Tradingview.com, "APPL Inc." retrieved online from May 3, 2015-Feb. 28, 2018, Tradingview.com/chart/ (Year: 2018).*
The ISR dated May 24, 2019 by the WIPO.
The CN1OA dated Nov. 12, 2018 by the CNIPA.
The CNNOA dated Feb. 26, 2019 by the CNIPA.

* cited by examiner

NUMERICAL VALUE DETERMINATION METHOD, NUMERICAL VALUE DETERMINATION APPARATUS, ELECTRONIC DEVICE AND STORAGE MEDIUM

CROSS-REFERENCE TO RELATED APPLICATIONS

The present application is the 371 application of PCT Application No. PCT/CN2019076197, filed on Feb. 26, 2019, which is based on and claims priority to Chinese Patent Application No. 201810172800.X, filed on Mar. 1, 2018, entire contents of both of which are incorporated by reference.

TECHNICAL FIELD

The present disclosure relates to the field of human-computer interactions, and in particular to a numerical value determination method, a numerical value determination apparatus, an electronic device and a computer-readable storage medium.

BACKGROUND

In computers or cell phone applications, it is often needed to adjust two related parameters and determine a final numerical value based on a result effected by the two parameters. There is no method in the prior art for conveniently adjusting two parameters simultaneously.

It should be noted that the information disclosed in the background is only used to enhance an understanding of the background of the present disclosure, and thus may include information that does not constitute prior art known to those skilled in the art.

SUMMARY

It is an object of the present disclosure to provide a numerical value determination method, a numerical value determination apparatus, an electronic device, and a computer-readable storage medium, thereby overcoming, at least to some extent, the problem in the prior art that two parameters cannot be adjusted simultaneously.

Other features and advantages of the disclosure will be apparent from the following detailed description, or may be learned in part by the practice of the disclosure.

According to an aspect of the disclosure, there is provided a numerical value determination method applied to a terminal configured to present an interactive interface which includes a sliding control, the method including: controlling the sliding control to move in the interactive interface according to a received operation event; acquiring a first projection position of the sliding control on a first coordinate axis corresponding to a first counting item and a second projection position of the sliding control on a second coordinate axis corresponding to the second counting item; determining a first counting value corresponding to the first counting item according to the first projection position and determining a second counting value corresponding to the second counting item according to the second projection position; and determining and presenting a target numerical value according to the first counting value and the second counting value.

According to an aspect of the present disclosure, there is provided a numerical value determination device applied to a terminal configured to present an interactive interface which includes a sliding control, the device including: a movement control module configured to control the sliding control to move in the interactive interface according to a received operation event; a coordinate detection module configured to acquire a first projection position of the sliding control on a first coordinate axis corresponding to a first counting item and a second projection position of the sliding control on a second coordinate axis corresponding to a second counting item; and a numerical value calculation module configured to determine a first counting value corresponding to the first counting item according to the first projection position, determine a second counting value corresponding to the second counting item according to the second projection position, and determine and present a target numerical value according to the first counting value and the second counting value.

According to an aspect of the present disclosure, there is provided an electronic device including: a processor; and a memory for storing instructions executable by the processor; wherein the processor is configured to perform any of the numerical determination methods described above via execution of the executable instructions.

According to an aspect of the present disclosure, there is provided a computer-readable storage medium having stored thereon a computer program which, when executed by a processor, implements any of the numerical value determination methods described above.

It is to be understood that both the foregoing general description and the following detailed description are merely exemplary and explanatory and should not be construed as limiting of the disclosure.

BRIEF DESCRIPTION OF THE DRAWINGS

The above and other features and advantages of the present disclosure will become more apparent by describing in detail exemplary embodiments thereof with reference to the accompanying drawings. It is obvious that the drawings in the following description are only some embodiments of the disclosure, and that those skilled in the art can obtain other drawings from these drawings without involving any inventive effort. In the drawings.

DETAILED DESCRIPTION

Figure 1:
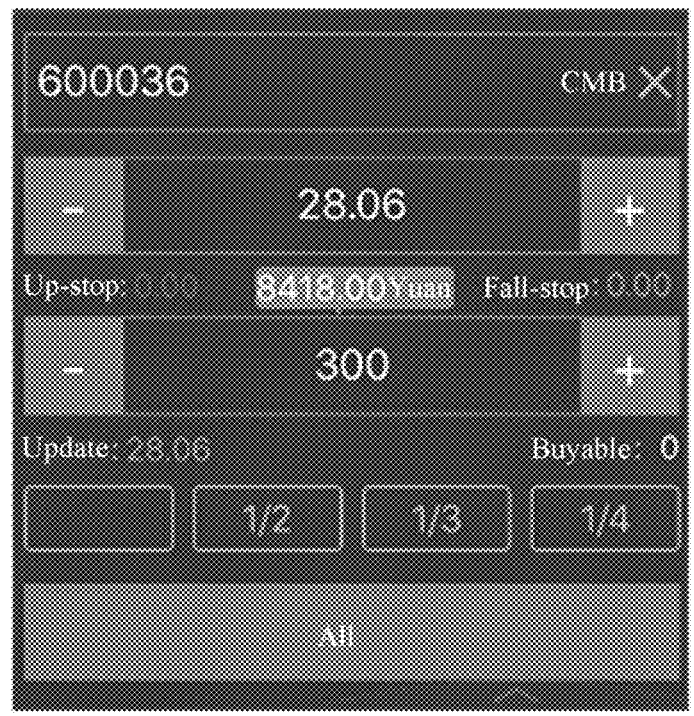
FIG. 1 is a schematic diagram of an interaction interface of stock exchange software in the related art.

Exemplary embodiments will now be described more fully with reference to the accompanying drawings. However, the exemplary embodiments can be implemented in a variety of forms and should not be construed as being limited to the embodiments set forth herein; rather, these embodiments are provided so that this disclosure will be thorough and complete, and the concept of exemplary embodiments will be fully conveyed to those skilled in the art. In the drawings, the same reference numerals denote the same or similar parts, and thus a repeated description thereof will be omitted.

Furthermore, the described features, structures, or characteristics can be combined in any suitable manner in one or more embodiments. In the following description, numerous specific details are set forth in order to provide a thorough understanding of embodiments of the present disclosure. However, it will be recognized by one skilled in the art that the inventive arrangements may be practiced without one or more of the specific details, or with other methods, components, materials, devices, steps, etc. In other instances, well-known structures, methods, devices, implementations, materials, or operations are not shown or described in detail to avoid obscuring aspects of the disclosure.

The block diagrams shown in the drawings are merely functional entities and do not necessarily have to correspond to physically separate entities. That is, the functional entities may be implemented in software, implemented or partly implemented in one or more software-hardened modules, or implemented in different networks, processor devices and/or microcontroller devices.

It should be noted that in the present disclosure, the terms of "a", "an", "the" and "said" are used to indicate the presence of one or more elements/components/etc.; the terms of "comprising", "including". "providing", and "having" are used in an open-ended inclusive sense and mean that there may be additional elements/components/etc. in addition to the listed elements/components/etc.; the terms of "first". "second" and the like are used merely as labels and are not intended to limit the number or order of their objects.

Figure 2:
FIG. 2 is a schematic diagram of an interaction interface of a game application in the related art.

A common numerical value determination scheme in the related art is to set two independent numerical value input controls, as shown in FIG. 1, taking an interaction interface of a stock exchange software as an example, when a user buys stocks, a stock price (28.06 in FIG. 1) and a stock quantity (300 in FIG. 1) are respectively input in two input boxes, and a trading volume (8418.00 Yuan in FIG. 1) is displayed in the interface. Then the user needs to adjust the stock price and the stock quantity separately, and determine the stock price and the stock quantity to be bought finally according to the trading volume. As shown in FIG. 2, in a resource selling interface of a game, a player inputs a quantity and a unit price of the sold wooden boards through two sliders, the game system calculates and displays a tax amount and a total price, and then the player adjusts the quantity and the unit price respectively to determine the final numerical value. There are disadvantages in such scheme that the two numerical values cannot be adjusted simultaneously, the two controls need to be adjusted separately and a value resulting from a combined effect of the two needs to be checked, and in order to determine the final numerical value, the adjusting usually needs to be performed multiple times, which is very inconvenient in operation.

Figure 3:
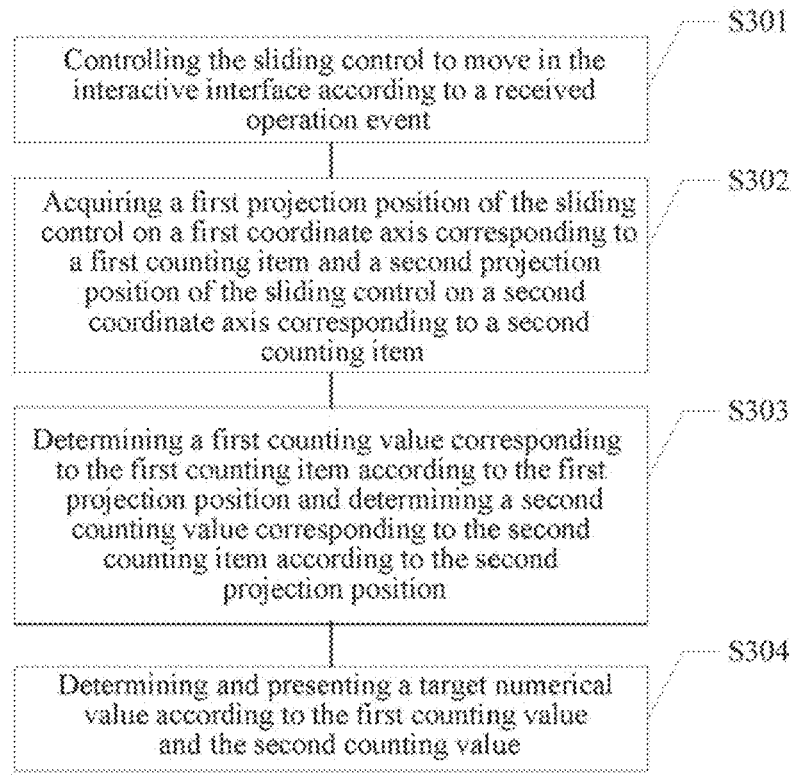
FIG. 3 is a flow chart illustrating a numerical value determination method in an exemplary embodiment of the present disclosure.

In an exemplary embodiment of the present disclosure, firstly, there is provided a numerical value determination method which can be applied to a terminal configured to present an interactive interface, and the interactive interface includes a sliding control. The interactive interface can be an entire displayable area of the terminal, such as a full-screen display, and can also be part of the displayable area of the terminal, such as a window display. The terminal can be an electronic device such as a desktop computer or a portable electronic device such as a tablet computer, a notebook computer, a game machine, a smart phone or the like. By installing applications such as game applications or other software applications, the applications are executed on the terminal. The terminal includes at least a memory for storing data and a processor for processing the data. The sliding control is a tool used by a user to select numerical values, which can be a point or a figure of a specific shape, such as a square, a circle or the like, and can be controlled to move. For example, in a touch device such as a mobile phone, a tablet computer or the like, the sliding control can be controlled to move by a touch operation, or in a desktop computer, the sliding control can be controlled to move through a mouse. Referring to FIG. 3, the method can include the following steps:

S301, controlling the sliding control to move in the interactive interface according to a received operation event;

S302, acquiring a first projection position of the sliding control on a first coordinate axis corresponding to a first counting item and a second projection position of the sliding control on a second coordinate axis corresponding to a second counting item:

S303, determining a first counting value corresponding to the first counting item according to the first projection position and determining a second counting value corresponding to the second counting item according to the second projection position; and

S304, determining and presenting a target numerical value according to the first counting value and the second counting value.

In the exemplary embodiment, the operation event can be an instruction made by the user to control the movement of the sliding control, such as a slide operation on a touch screen, a drag operation with a left button of the mouse or the like. The first counting item and the second counting item can be two parameters the numerical values of which needs to be determined by the user, such as the stock price and the stock quantity in stock trading, the unit price and the quantity of wood material sold in games, or the like. The first counting item and the second counting item are reflected in the interactive interface in a form of planar number axes, the first coordinate axis corresponds to the first counting item, and the second coordinate axis corresponds to the second counting item. The first coordinate axis and the second coordinate axis can be always displayed in the interactive interface, can be never displayed, or can be set to be displayed upon a specific position of the interactive interface is clicked and to be hidden if there is no operation event in a period of time. The sliding control can have a corresponding first projection position and a corresponding second projection position on two coordinate axes, and the projection position can be a position of an intersection point of a line which is vertical to a coordinate axis and passes through the sliding control with the coordinate axis, a position of an intersection point of a line which is parallel to a coordinate axis and passes through the sliding control with the other coordinate axis, or a position projected by other methods. The projection positions can be displayed in the interactive interface. For example, corresponding projection points can be displayed on the two coordinate axes, projection paths can be displayed as dotted lines or the like, or the projection positions can be not displayed in the interactive interface. For example, when the coordinate axes are not displayed, the projection positions are not displayed, or only coordinates corresponding to the projection positions are displayed. The numerical values corresponding to the first projection position and the second projection position on the respective coordinate axes are respectively a first counting value and a second counting value, and in general, and a process of detecting the first counting value and the second counting value by the terminal can be as follows. Firstly, plane position coordinates of the sliding control are detected in an interactive interface of an application, the plane position coordinate consisting of two numerical values, and then the plane position coordinates are converted into the first counting value and the second counting value according to a preset algorithm. A target numerical value can also be presented in the interactive interface, and the target numerical value refers to a numerical value of a result calculated through the first counting value and the second counting value, such as the stock trading volume (8418.00) in FIG. 1, the total price in FIG. 2 or the like. When the sliding control is moved, the first counting value, the second counting value and the target numerical value are all changed in real time, and a final first counting value, a final second counting value and a final target numerical value can be determined by moving the sliding control to an appropriate position.

Figure 4:
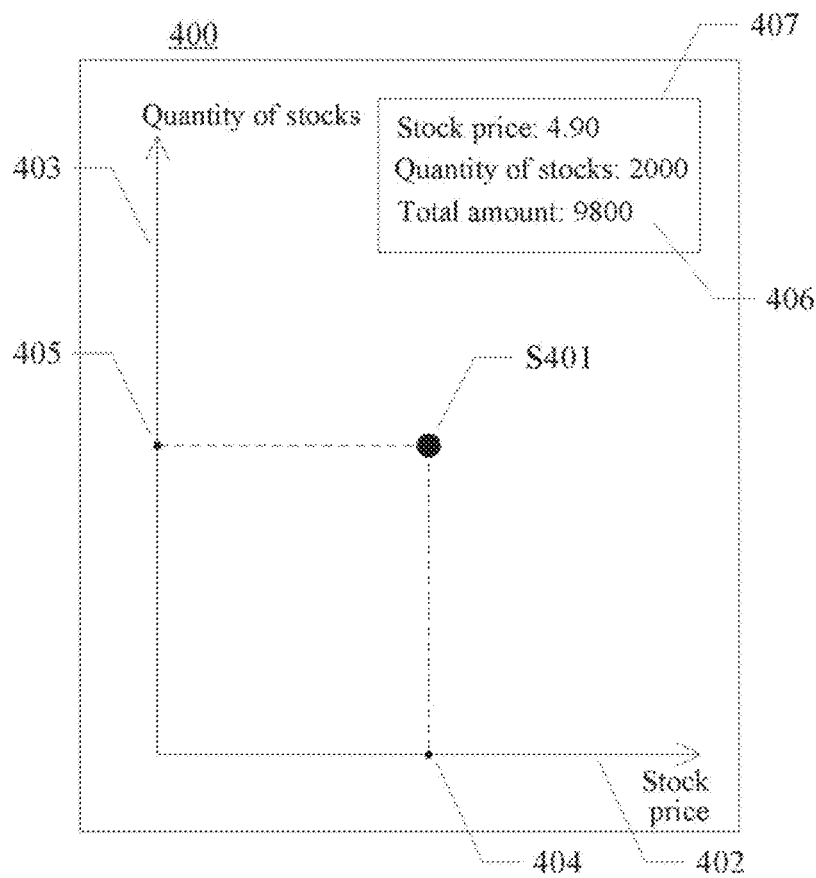
FIG. 4 illustrates a schematic diagram of a numerical value determination interaction interface in an exemplary embodiment of the present disclosure.

In an exemplary embodiment, as shown in FIG. 4, in an example of an interactive interface 400 for stock exchange software, it can include a sliding control 401, a first coordinate axis 402, and a second coordinate axis 403. The sliding control 401 can be a circular sliding button having a first projection position 404 on the first coordinate axis 402 and a second projection position 405 on the second coordinate axis 403. The first counting item corresponding to the first coordinate axis 402 can be the stock price, the second counting item corresponding to the second coordinate axis 403 can be the stock quantity, and the target numerical value 406 can be the trading volume. The numerical values of the three parameters of the stock price, the stock quantity and the trading volume can be displayed in a numerical value area 407. The method for determination of the numerical values of each parameter in the interface of the stock exchange software can include:

moving the sliding control 401 to a certain position by the user;

detecting a first coordinate corresponding to a first projection position 404 of the position and a second coordinate corresponding to a second projection position 405 of the position;

converting the first coordinate into a stock price, and converting the second coordinate into a stock quantity;

according to specific numerical values of the stock price and the stock quantity, calculating and presenting, by the program, a numerical value of the stock trading volume, so that the numerical values of the three parameters of the stock price, the stock quantity and the trading volume can be determined.

In the present exemplary embodiment, the user can simultaneously adjust the associated first and second counting values by moving the sliding control in the interactive interface, and can see the target numerical value resulting from the combined effect of the counting values in real time, so that the final numerical values of the first counting value, the second counting value and the target numerical value are determined, which is convenient in operation. On the other hand, the user can adjust the first counting value and the second counting value into various combinations of the numerical values by moving the sliding control in various directions, and intuitively compare the target numerical values for the combinations of the numerical values, which facilitates determining the optimal numerical value combination of the first counting value and the second counting value according to the target numerical values.

The interactive interface of the stock exchange software is provided in the above embodiment as a situation in which the numerical value determination method is applied, which is intended to illustrate by way of example, and the numerical value determination method of the exemplary embodiment can also be applied to other software applications. For example, in a company business simulation game, an employee wage and the number of the employees need to be determined, and the total wages are calculated according to the wage and the number of the employees. Thus, the numerical value determination method of the present embodiment can be applied to determine the numerical values of the employee wage, the number of employees and the total wages.

In an exemplary embodiment, in order to display the first counting value and the second counting value more intuitively, the numerical value determination method can further include the following steps of:

presenting a first slider parallel to the first coordinate axis and a second slider parallel to the second coordinate axis, wherein the sliding control is positioned on the first slider and can slide along the first slider, and the first slider can slide along the second slider.

Figure 5A:
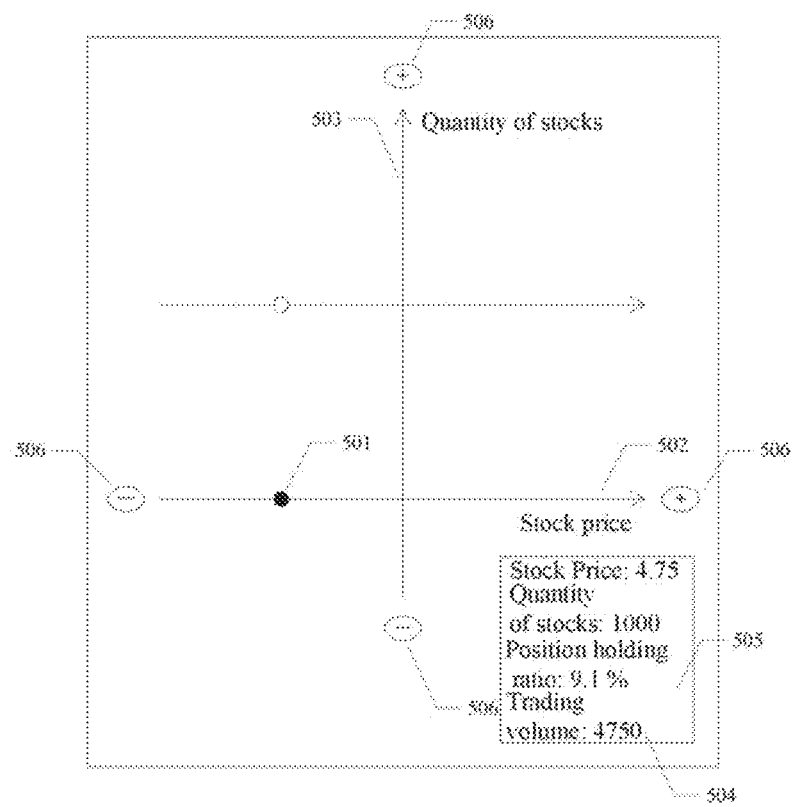
FIG. 5a illustrates a schematic diagram of a numerical value determination interaction interface in an exemplary embodiment of the present disclosure.
Figure 5B:
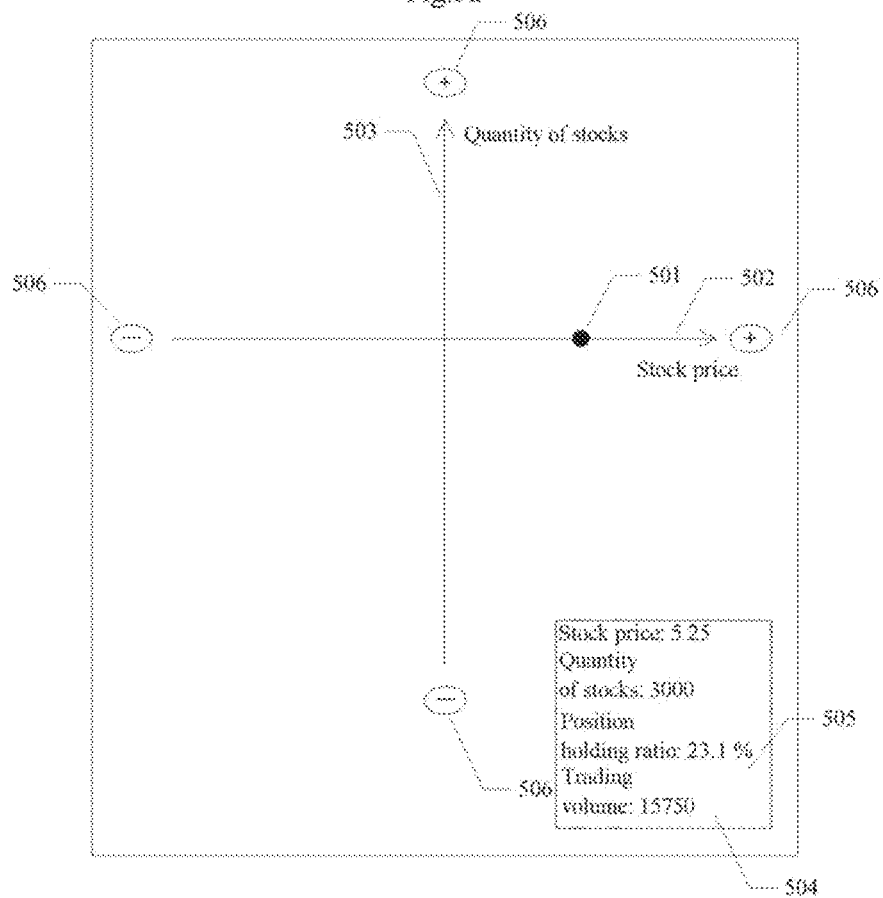
FIG. 5b illustrates a schematic diagram of a numerical value determination interaction interface in an exemplary embodiment of the present disclosure.

Illustratively, as shown in FIGS. 5*a* and 5*b*, the first slider 502 can correspond to the stock price, the second slider 503 can correspond to the stock quantity, and when the first slider 502 and the second slider 503 are presented, the first coordinate axis and the second coordinate axis may be not displayed. The sliding control 501 is always located on the first slider 502, and a moving path of the sliding control 501 can be considered to be composed of two parts. In an example of moving the sliding control 501 from the position in FIG. 5*a* to the position in FIG. 5*b*, the sliding control 501 moves synchronously with the first slider 502 along the second slider 503 to a position shown in the dotted line in FIG. 5*a*, and the sliding control 501 moves individually along the first slider 502 from the dotted line position in FIG. 5*a* to the position in FIG. 5*b*. It will be apparent that the position of the sliding control 501 on the first slider 502 corresponds to the first counting value, the intersection point of the second slider 503 with the first slider 502 corresponds to the second counting value, and the combined effect of two counting values results in the target numerical value 504.

It is to be noted that the first slider and the second slider are arranged so that the user can more intuitively see the first counting value and the second counting value corresponding to the current position when moving the sliding control, and a primary difference between the sliders and the coordinate axes is that the sliders are movable and the coordinate axes are generally fixed, so that corresponding coordinate scales, endpoint values and the like can be marked on the sliders without displaying the first coordinate axis and the second coordinate axis, and thus the sliders can serve as the coordinate axes at the same time, the display of the numerical values is more intuitive, and the whole interactive interface is more concise. Division of the moving path of the sliding control into two parts as described above is for convenience of explanation, and they are not prioritized. When the movement of the sliding control is processed in the application program, the moving path is actually divided into much more subdivided paths according to a precision set by the program, and then each of the subdivided paths is divided into two parts for processing.

In an exemplary embodiment, the first coordinate axis is a transverse axis, the second coordinate axis is a longitudinal axis, and the two coordinate axes are perpendicular to each other, so that the first slider and the second slider which are respectively parallel to the first coordinate axis and the second coordinate axis are also perpendicular to each other. In other embodiments, when applying to interactive interfaces of other programs, the first slider and the second slider may be not perpendicular to each other. For example, on a X-Y plane of a monoclinic crystal system in a crystal structure, a X crystallization axis is not perpendicular to a Y crystallization axis, the numerical values of lattice parameters are determined by the numerical value determination method of the present exemplary embodiment in crystal structure simulation software, and the first coordinate axis can be the X crystallization axis, and the second coordinate axis can be the Y crystallization axis. The first slider is parallel to the X crystallization axis, the second slider is parallel to the Y crystallization axis, and the first slider is not perpendicular to the second slider. As can be seen, the specific forms of the slider are related to the application environment, the parameter characteristics and the like, and the specific forms and a mutual position relationship of the first slider and the second slider are not particularly limited in the present disclosure.

In this exemplary embodiment, the first slider parallel to the transverse axis is slidable and the second slider parallel to the longitudinal axis is fixed. In other embodiments, however, it might be on the contrary. For example, the first slider may be parallel to the longitudinal axis, the second slider may be parallel to the transverse axis, and thus the first slider parallel to the longitudinal axis is slidable and the second slider parallel to the transverse axis is fixed. As previously mentioned, the references to "first" of the first slider and "second" of the second slider in the present disclosure are used merely as labels and are not intended to define the order or positional relationship of the two sliders.

Furthermore, in an exemplary embodiment, the sliding control can be always positioned at the intersection point of the first slider and the second slider, and the second slider can also slide along the first slider, so that the moving path of the sliding control can be divided into two parts: the sliding control and the first slider move synchronously along the second slider, and the sliding control and the second slider synchronously move along the first slider. In this process, the sliding control is always located at the intersection position of the two sliders. Then, the position of the intersection point on the first slider corresponds to the first counting value, and the position on the second slider corresponds to the second counting value.

In addition, moving a sliding control in the interactive interface usually requires a sliding operation after pressing the sliding control on a touch screen, or a dragging operation on the sliding control by long-pressing a left button of a mouse. In the embodiments described above for presenting the sliders, since the sliding control can be moved together with the first slider or the second slider, it can be provided that the sliding control is moved synchronously by operating the slider to move. For example, in the interactive interface shown in FIG. 5a, the user can continuously press on any position of the first slider 502, slide up and down to move it, and the sliding control 501 can follow the first slider 502 to synchronously move up and down. Furthermore, without being limited to the arrangements in the exemplary embodiment described above, the sliding control can also be controlled to move through other forms of operation events. For example, the sliding control can be controlled to move upwards through an up-sliding operation in any area of the touch screen, and to move rightwards through a right-sliding operation in any area; or the sliding control can be controlled to move up and down through up-sliding and down-sliding operations in the left half area of the touch screen, and to move left and right through up-sliding and down-sliding operations in the right half area of the touch screen.

In an exemplary embodiment, the numerical value determination method can further include:

determining and presenting a reference numerical value according to the first counting value or the second counting value.

The reference numerical value refers to a parameter which is associated with the first counting value or the second counting value separately and is presented in the interactive interface, so that the user can determine the first counting value and the second counting value by referring to this numerical value. As shown in FIGS. 5a and 5b, the reference numerical value 504 can be a holding ratio separately associated with the stock quantity, and the holding ratio will be changed in real time as the user adjusts the stock quantity. The user can determine the stock quantity and the stock price by referring to this numerical value. It should be noted that there can be one reference numerical value which can be separately associated with the first counting value or with the second counting value; or there can also be several reference numerical values, some of which can be separately associated with the first counting value and the others of which can be separately associated with the second counting value, or all of which can be separately associated with either the first counting value or the second counting value.

In an exemplary embodiment, virtual buttons can also be provided within the interactive interface. As shown in FIGS. 5a and 5b, the virtual buttons 506 can be "+" and "−" and can be located at both ends of the first slider 502 and the second slider 503, respectively, as an adjustment assisting tool. The user can fine-tune the position of the slider control 501 by clicking the virtual buttons 506. For example, by clicking the "+" button of the first slider 502, and the slider control 501 is slightly shifted to the right, and by clicking the "−" button of the second slider 503, the sliding control 501 is slightly moved downward, thereby improving the accuracy of the position adjustment of the sliding control 501. The virtual buttons can also include other functional buttons, such as "X return to zero", "Y return to zero". etc., to further enhance convenience of operation.

In order to achieve more functions and enable the user to determine numerical values according to different requirements, in an exemplary embodiment, endpoint values of the first slider or the second slider can be set to be adjustable. For example, for the first slider corresponding to the stock price, a left endpoint value is 4.50, a right endpoint value is 5.50, the endpoint values can be set to be changed by a direct input, and a precision of the numerical value corresponding to the first slider is correspondingly changed. Correspondingly, the endpoint values of the second slider can also be changed, so that the user can set different ranges of adjustment for the first counting value and the second counting value to move the sliding control within such ranges, which facilitates the determination of the final numerical value. Further, the parameters corresponding to the first counting item or the second counting item can also be changed by setting. In an exemplary embodiment, an option box can be included in the stock exchange interactive interface through which the user can select a stock category, and accordingly, the first slider representing the stock price can automatically adjust the initial endpoint value to correspond to the current stock.

In practical applications, there may be a plurality of target numerical values resulting from the combined effect of the first counting value and the second counting value. For example, there are two target numerical values, the tax amount and the total price as shown in FIG. 2. Thus, in an exemplary embodiment, the target numerical value can include a first target numerical value and a second target numerical value, and in the present embodiment, the first target numerical value can be a stock trading volume, and the second target numerical value can be a stamp tax amount for the stock trading. Presenting the two target numerical values facilitates the user to determine the first counting value and the second counting value by comprehensively considering the results of the respective target numerical values. It should be noted that the number of target numerical values is not limited to one or two, as long as the target numerical values are determined and presented by using the first counting value and the second counting value according to the value determination method, which falls within the scope of the claimed invention, regardless of the number.

Figure 6:
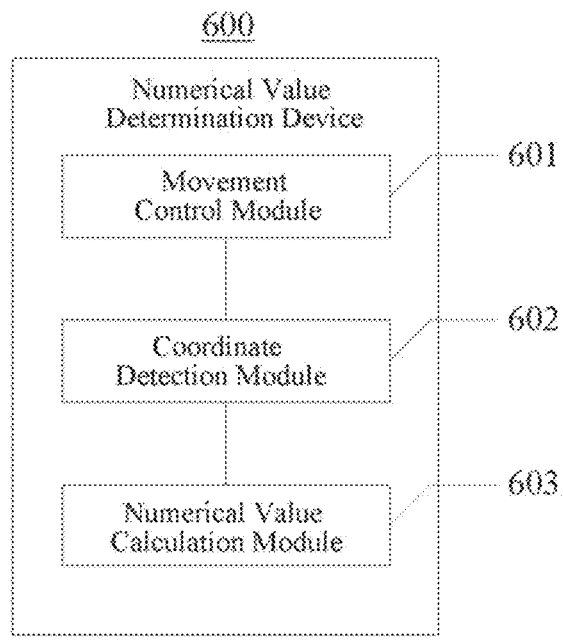
FIG. 6 is a block diagram illustrating a numerical value determination apparatus according to an exemplary embodiment of the present disclosure.

In an exemplary embodiment of the present disclosure, there is also provided a numerical value determination device applied to a terminal configured to present an interactive interface which includes a sliding control. As shown in FIG. 6, the numerical value determination device 600 can include:

a movement control module 601 configured to control the sliding control to move in the interactive interface according to a received operation event;

a coordinate detection module 602 configured to acquire a first projection position of the sliding control on a first coordinate axis corresponding to a first counting item and a second projection position of the sliding control on a second coordinate axis corresponding to a second counting item; and a numerical value calculation module 603 configured to determine a first counting value corresponding to the first counting item according to the first projection position, determine a second counting value corresponding to the second counting item according to the second projection position, and determine and present a target numerical value according to the first counting value and the second counting value.

Details of the respective functional modules of the numerical value determination device 600 have been described in the corresponding numerical value determination method, and thus will not be repeated herein.

In an exemplary embodiment of the present disclosure, an electronic device capable of implementing the above method is also provided.

Those skilled in the art will appreciate that aspects of the present disclosure can be implemented as a system, a method, or a program product. Accordingly, aspects of the disclosure may be embodied in the form of an entirely hardware implementation, an entirely software implementation (including firmware, microcode, etc.), or an implementation combining hardware and software aspects which can be collectively referred to herein as a "circuit", "module", or "system".

An electronic device 700 according to this embodiment of the present disclosure will now be described with reference to FIG. 7. The electronic device 700 shown in FIG. 7 is merely exemplary and should not construed as any limitation on the functionality and applicable scope of embodiments of the present disclosure.

Figure 7:
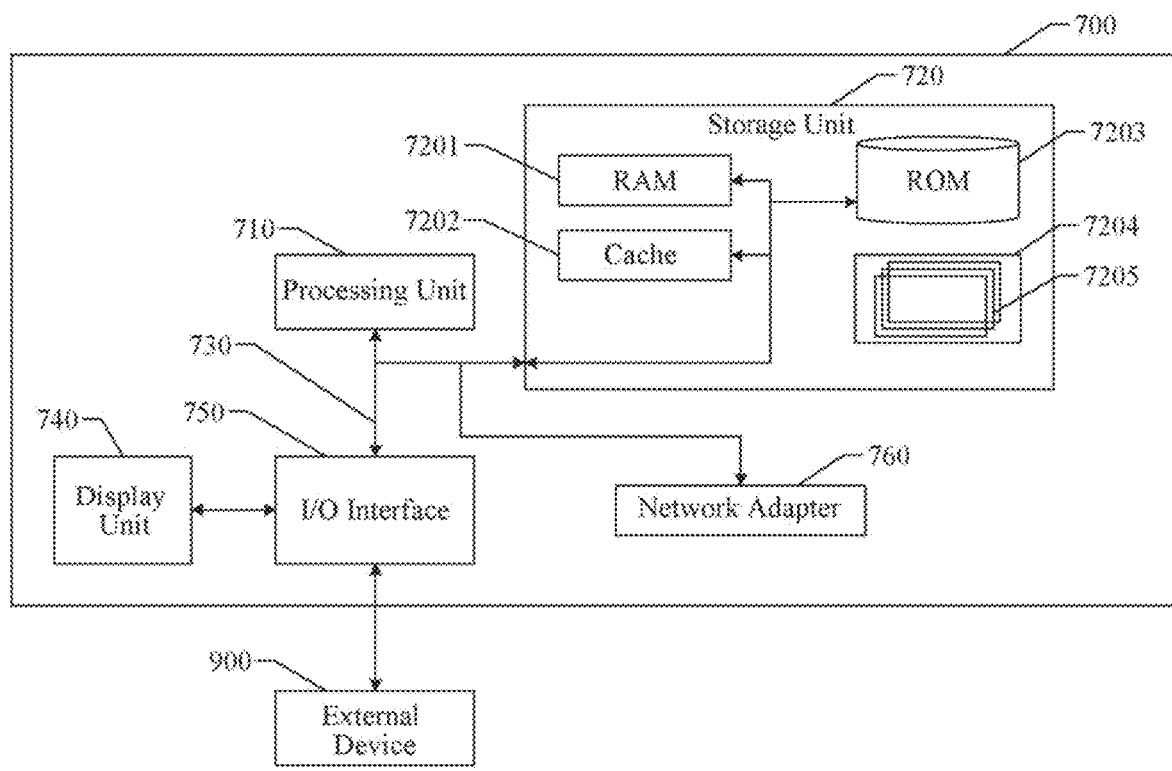
FIG. 7 illustrates a block diagram of an electronic device in an exemplary embodiment of the present disclosure.

As shown in FIG. 7, the electronic device 700 is embodied in a form of a general purpose computing device. Components of the electronic device 700 can include, but are not limited to: the at least one processing unit 710 as described above, the at least one storage unit 720 as described above, a bus 730 connecting different system components including the storage unit 720 and the processing unit 710, and a display unit 740.

The storage unit stores program codes that can be executed by the processing unit 710 to cause the processing unit 710 to perform the steps according to various exemplary embodiments of the present disclosure described in the above-mentioned "exemplary methods" of the description. For example, the processing unit 710 can perform the steps of: S301, controlling the sliding control to move in the interactive interface according to a received operation event; S302, acquiring a first projection position of the sliding control on a first coordinate axis corresponding to a first counting item and a second projection position of the sliding control on a second coordinate axis corresponding to a second counting item; S303, determining a first counting value corresponding to the first counting item according to the first projection position and determining a second counting value corresponding to the second counting item according to the second projection position; and S304, determining and presenting a target numerical value according to the first counting value and the second counting value, as shown in FIG. 3.

The storage unit 720 can include a readable medium in the form of volatile memory units, such as a random access memory (RAM) unit 7201 and/or a cache storage unit 7202, and can further include a read-only memory unit (ROM) 7203.

The storage unit 720 can also include a program/utility 7204 having a set (at least one) of program modules 7205 including, but not limited to: an operating system, one or more application programs, other program modules and program data, and each or some combinations of these examples can include an implementation of a network environment.

The bus 730 can represent one or more of several types of bus structures, including a local bus in a storage unit bus or a storage unit controller, a peripheral bus, a graphics acceleration port, a processing unit, or a local bus in any type of bus structure using a variety of bus structures.

The electronic device 700 can also communicate with one or more external devices 900 (e.g., a keyboard, a pointing device, a Bluetooth device, etc.), one or more devices that enable a user to interact with the electronic device 700, and/or any device (e.g., a router, a modem, etc.) that enables the electronic device 700 to communicate with one or more other computing devices. This communication can be performed through an input/output (I/O) interface 750. The electronic device 700 can also communicate with one or more networks (e.g., a local area network (LAN), a wide area network (WAN), and/or a public network such as the Internet) via a network adapter 760. As shown, the network adapter 760 communicates with other modules of the electronic device 700 over the bus 730. It should be understood that although not shown in the figures, other hardware and/or software modules can be utilized in conjunction with the electronic apparatus 700, including but not limited to:

microcode, device drives, redundant processing units, external disk drive arrays, RAID systems, tape drives, data backup storage systems, etc.

From the foregoing description of embodiments, those skilled in the art will readily appreciate that the exemplary embodiments described herein can be implemented in software or in combination of software with necessary hardware. Thus, the technical solution according to the embodiments of the disclosure can be embodied in the form of a software product, which can be stored in a non-volatile storage medium (which can be a CD-ROM, a USB flash drive, a mobile hard disk, etc.) or on a network, and can include instructions for causing a computing device (which may be a personal computer, a server, a terminal device, or a network device, etc.) to perform the method according to embodiments of the disclosure.

In an exemplary embodiment of the present disclosure, there is also provided a computer-readable storage medium having stored thereon a program product capable of implementing the methods described herein. In some possible embodiments, various aspects of the present disclosure can also be implemented in the form of a program product including program codes which, when being executed on a terminal device, causes the terminal device to perform the steps according to various exemplary embodiments of the disclosure described in the above-mentioned "exemplary methods" of the description.

Figure 8:
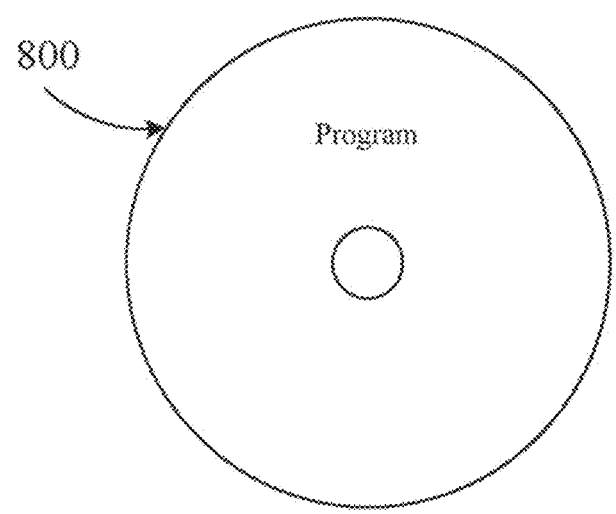
FIG. 8 shows a schematic diagram of a program product in an exemplary embodiment of the present disclosure.

Referring to FIG. 8, a program product 800 for implementing the above method according to an embodiment of the present disclosure is described, which can employ a portable compact disc read only memory (CD-ROM) and includes program codes, and can be run on a terminal device such as a personal computer. However, the program product of the present disclosure is not limited thereto, and in this document, a readable storage medium can be any tangible medium that contains or stores a program for use by or in connection with an instruction execution system, apparatus, or device.

The program product can employ any combination of one or more readable media. The readable medium can be a readable signal medium or a readable storage medium. The readable storage medium can be, for example, but not limited to, an electrical, magnetic, optical, electromagnetic, infrared, or semiconductor system, apparatus, or device, or any combination thereof. More specific examples (a non-exhaustive list) of the readable storage medium include: an electrical connection with one or more wires, a portable disk, a hard disk, a random access memory (RAM), a read only memory (ROM), an erasable programmable read only memory (EPROM or Flash memory), an optical fiber, a portable compact disk read only memory (CD-ROM), an optical storage device, a magnetic storage device, or any suitable combination thereof.

The computer readable signal medium can include a data signal propagated in baseband or as part of a carrier wave, and carries readable program code. Such propagated data signals can take a variety of forms, including but not limited to electromagnetic signals, optical signals, or any suitable combination thereof. The readable signal medium can also be any readable medium other than the readable storage medium that can send, propagate, or transmit the program for use by or in connection with the instruction execution system, apparatus, or device.

The program code included in the readable medium can be transmitted over any suitable medium including, but not limited to, wireless, wired, fiber optic, RF, and the like, or any suitable combination thereof.

Program code for carrying out operations of the present disclosure can be written in any combination of one or more programming languages, including object-oriented programming languages such as Java, C++, and the like, as well as conventional procedural programming languages such as the "C" language or similar programming languages. The program code can be executed entirely or partially on a user computing device, executed as a stand-alone software package, executed partially on the user computing device and partially on a remote computing device, or executed entirely on the remote computing device or a server. In the case involving a remote computing device, the remote computing device can be connected to the user computing device through any kind of network, including a local area network (LAN) or a wide area network (WAN), or can be connected to an external computing device (e.g., through internet provided by an Internet service provider).

Moreover, the above-described drawings are only illustrative of the processing involved in the method according to exemplary embodiments of the present disclosure, and are not intended to be limiting. It will be readily appreciated that the processing illustrated in the above figures do not indicate or limit the temporal order of these processing. In addition, it will also be readily appreciated that these processing can be performed synchronously or asynchronously, for example, in multiple modules.

It should be noted that although in the foregoing detailed description reference has been made to several modules or elements of an apparatus for performing actions, such division is not mandatory. Indeed, the features and functions of two or more modules or units described above can be embodied in one module or unit in accordance with embodiments of the present disclosure. Conversely, features and functions of one module or unit described above can be further divided to be embodied by multiple modules or units.

Other embodiments of the disclosure will be apparent to those skilled in the art from consideration of the specification and practice of the disclosure disclosed herein. This application is intended to cover any variations, uses, or adaptations of the disclosure which follow the general principles of the disclosure and include common general knowledge or customary technical means in the art that are not disclosed herein. The specification and embodiments are merely illustrative, with a true scope and spirit of the disclosure being indicated by the following claims.

It is to be understood that the disclosure is not limited to the precise constructions described above and shown in the drawings, and that various modifications and changes can be made without departing from the scope thereof. The scope of the disclosure is limited only by the accompanying claims.

The invention claimed is:

1. A numerical value determination method, applied to a terminal configured to present an interactive interface which comprises a sliding control, the method comprising:
presenting a first slider parallel to a first coordinate axis corresponding to a first counting item and presenting a second slider parallel to a second coordinate axis corresponding to a second counting item, wherein the sliding control is located on the first slider and is configured to slide along the first slider, when the sliding control is located at the intersection of the first and second sliders, the first slider is configured to slide along the second slider and the second slider is configured to slide along the first slider, and when the sliding control is not located at the intersection of the first and second sliders, the first slider is configured to slide along the second slider and the second slider is fixed;

controlling the sliding control to move in the interactive interface according to a received operation event;

acquiring a first projection position of the sliding control on the first coordinate axis and a second projection position of the sliding control on the second coordinate axis;

determining a first counting value corresponding to the first counting item according to the first projection position and determining a second counting value corresponding to the second counting item according to the second projection position; and determining and presenting a target numerical value calculated by a determined method according to the first counting value and the second counting value.

2. The numerical value determination method of claim 1, wherein the first slider is perpendicular to the second slider.

3. The numerical value determination method of claim 1, wherein the method further comprises:

determining and presenting a reference numerical value according to the first counting value or the second counting value.

4. The numerical value determination method of claim 1, wherein the interactive interface further comprises virtual buttons for adjusting a position of the sliding control.

5. The numerical value determination method of claim 4, wherein the virtual buttons are located at both ends of the first slider and at both ends of the second slider, respectively.

6. The numerical value determination method of claim 5, wherein the target numerical value comprises a first target numerical value and a second target numerical value.

7. An electronic device configured to present an interactive interface which comprises a sliding control, the electronic device comprising:

a processor; and a memory for storing instructions executable by the processor;

wherein the processor is configured to:

present a first slider parallel to a first coordinate axis corresponding to a first counting item and presenting a second slider parallel to a second coordinate axis corresponding to a second counting item, wherein the sliding control is located on the first slider and is configured to slide along the first slider, when the sliding control is located at the intersection of the first and second sliders, the first slider is configured to slide along the second slider and the second slider is configured to slide along the first slider, and when the sliding control is not located at the intersection of the first and second sliders, the first slider is configured to slide along the second slider and the second slider is fixed;

control the sliding control to move in the interactive interface according to a received operation event;

acquire a first projection position of the sliding control on the first coordinate axis and a second projection position of the sliding control on the second coordinate axis;

determine a first counting value corresponding to the first counting item according to the first projection position, and determine a second counting value corresponding to the second counting item according to the second projection position; and determine and present a target numerical value calculated by a determined method according to the first counting value and the second counting value.

8. The electronic device of claim 7, wherein the first slider is perpendicular to the second slider.

9. The electronic device of claim 7, wherein processor is further configured to:

determine and present a reference numerical value according to the first counting value or the second counting value.

10. The electronic device of claim 7, wherein the interactive interface further comprises virtual buttons for adjusting a position of the sliding control.

11. The electronic device of claim 10, wherein the virtual buttons are located at both ends of the first slider and at both ends of the second slider, respectively.

12. The electronic device of claim 11, wherein the target numerical value comprises a first target numerical value and a second target numerical value.

13. A non-transitory computer-readable storage medium having stored thereon a computer program which, when executed by a processor, causes the processor to perform a numerical value determination method applied to a terminal configured to present an interactive interface which comprises a sliding control, the method comprising:

presenting a first slider parallel to a first coordinate axis corresponding to a first counting item and presenting a second slider parallel to a second coordinate axis corresponding to a second counting item, wherein the sliding control is located on the first slider and is configured to slide along the first slider, when the sliding control is located at the intersection of the first and second sliders, the first slider is configured to slide along the second slider and the second slider is configured to slide along the first slider, and when the sliding control is not located at the intersection of the first and second sliders, the first slider is configured to slide along the second slider and the second slider is fixed;

controlling the sliding control to move in the interactive interface according to a received operation event;

acquiring a first projection position of the sliding control on the first coordinate axis and a second projection position of the sliding control on the second coordinate axis;

determining a first counting value corresponding to the first counting item according to the first projection position and determining a second counting value corresponding to the second counting item according to the second projection position; and determining and presenting a target numerical value calculated by a determined method according to the first counting value and the second counting value.

* * * * *